(12) United States Patent
Pfeuffer

(10) Patent No.: US 9,782,841 B2
(45) Date of Patent: Oct. 10, 2017

(54) CUTTING TOOL

(71) Applicant: Kennametal Inc., Latrobe, PA (US)

(72) Inventor: Herr Bernd Pfeuffer, Iphofen (DE)

(73) Assignee: KENNAMETAL INC., Latrobe, PA (US)

( * ) Notice: Subject to any disclaimer, the term of this patent is extended or adjusted under 35 U.S.C. 154(b) by 111 days.

(21) Appl. No.: 14/474,988

(22) Filed: Sep. 2, 2014

(65) Prior Publication Data

US 2015/0078840 A1 Mar. 19, 2015

(30) Foreign Application Priority Data

Sep. 19, 2013 (DE) .................. 10 2013 218 884

(51) Int. Cl.
*B23C 5/28* (2006.01)
*B23C 5/10* (2006.01)
*B23B 31/00* (2006.01)

(52) U.S. Cl.
CPC .............. *B23C 5/10* (2013.01); *B23B 31/005* (2013.01); *B23C 5/109* (2013.01); *B23B 2240/08* (2013.01); *B23B 2240/11* (2013.01); *B23B 2260/138* (2013.01); *B23C 2210/02* (2013.01); *B23C 2240/00* (2013.01); *B23C 2240/08* (2013.01); *B23C 2240/24* (2013.01); *Y10T 407/1908* (2015.01)

(58) Field of Classification Search
CPC . B23B 31/11; B23B 31/1107; B23B 31/1122; B23B 31/1115; B23B 31/006; B23B 2231/0296; B23B 2231/0204; B23C 5/26; B23Q 3/12
See application file for complete search history.

(56) References Cited

U.S. PATENT DOCUMENTS

| | | | | |
|---|---|---|---|---|
| 2,708,853 A | * | 5/1955 | MacLean | B23B 31/005 408/226 |
| 2,766,791 A | * | 10/1956 | Givens | B23B 31/005 408/226 |
| 2,896,955 A | * | 7/1959 | Treppard | B23B 31/11 279/7 |
| 3,859,699 A | | 1/1975 | Lindskog | |
| 3,876,319 A | * | 4/1975 | Meyer | E21B 17/0426 403/343 |

(Continued)

FOREIGN PATENT DOCUMENTS

| | | |
|---|---|---|
| CN | 201931146 U | 8/2011 |
| CN | 102971101 A | 3/2013 |

(Continued)

OTHER PUBLICATIONS

Komet®—solid drilling.
Sep. 7, 2015 First office action 14510275.
Jun. 27, 2017 First office action K-04291-CN-NP.

*Primary Examiner* — Will Fridie, Jr.
(74) *Attorney, Agent, or Firm* — Matthew S. Bedsole

(57) ABSTRACT

The invention relates to a cutting tool, particularly for use in a tool chuck of a machine tool, including a tool shaft with a center longitudinal axis and a tool head. The tool head is connected to the tool shaft via a positive-locking connection, which locks the movement in the direction of the center longitudinal axis and the positive-locking connection is supplemented by a bonded connection, particularly a soldered connection.

11 Claims, 3 Drawing Sheets

(56) References Cited

U.S. PATENT DOCUMENTS

| | | | | |
|---|---|---|---|---|
| 4,725,173 A * | 2/1988 | Hoffman | B23B 31/1077 | 279/67 |
| 4,834,597 A * | 5/1989 | Andersson | B23B 31/006 | 279/103 |
| 4,871,286 A * | 10/1989 | Hunt | B23B 27/007 | 279/8 |
| 5,125,774 A | 6/1992 | Catenacci | | |
| 5,391,022 A | 2/1995 | Nakayama et al. | | |
| 5,971,670 A * | 10/1999 | Pantzar | B23B 31/1107 | 407/119 |
| 6,402,605 B1 * | 6/2002 | Christiansen | B23B 31/008 | 408/145 |
| 6,599,050 B1 * | 7/2003 | Sjoo | B23B 31/008 | 403/374.3 |
| 6,599,068 B1 * | 7/2003 | Miyazawa | B23B 31/006 | 279/103 |
| 7,278,196 B1 | 10/2007 | Stojanovski | | |
| 7,527,459 B2 * | 5/2009 | Stojanovski | B23B 31/006 | 279/8 |
| 8,414,085 B2 | 4/2013 | Hall et al. | | |
| 2001/0013429 A1 | 8/2001 | Hauptmann | | |
| 2002/0006315 A1 * | 1/2002 | Harpaz | B23B 31/11 | 407/30 |
| 2002/0021945 A1 * | 2/2002 | Harpaz | B23B 31/11 | 407/53 |
| 2004/0057811 A1 * | 3/2004 | Kelzer | B23B 31/1122 | 411/389 |
| 2006/0257215 A1 * | 11/2006 | Kakai | B23B 31/11 | 407/101 |
| 2008/0100006 A1 * | 5/2008 | Chu | B23B 31/008 | 279/79 |
| 2008/0166198 A1 * | 7/2008 | Stojanovski | B23B 31/006 | 409/234 |
| 2008/0304923 A1 * | 12/2008 | Lehto | B23B 31/005 | 407/100 |
| 2009/0279973 A1 * | 11/2009 | Erickson | B23B 31/1077 | 408/240 |
| 2010/0189523 A1 * | 7/2010 | Nonaka | B23B 31/11 | 408/226 |
| 2010/0272533 A1 * | 10/2010 | Hecht | B23B 31/008 | 408/153 |
| 2011/0274510 A1 * | 11/2011 | Stoneback | B23B 31/006 | 409/131 |
| 2013/0022415 A1 * | 1/2013 | Osawa | B23B 31/1107 | 407/46 |
| 2015/0030407 A1 * | 1/2015 | Chen | B23B 31/006 | 409/234 |
| 2015/0202690 A1 * | 7/2015 | Haimer | B23B 31/1115 | 279/99 |
| 2015/0217380 A1 * | 8/2015 | Haimer | B23B 31/005 | 279/99 |
| 2015/0360295 A1 * | 12/2015 | Haimer | B23B 31/1115 | 279/20 |

FOREIGN PATENT DOCUMENTS

| | | |
|---|---|---|
| DE | 3431494 A1 | 3/1986 |
| DE | 3431495 A1 | 3/1986 |
| DE | 102004034763 A1 | 3/2006 |
| EP | 101917 B1 | 5/1986 |
| EP | 0391881 A2 | 10/1990 |
| JP | 5264077 S5 | 5/1977 |
| JP | 11151608 A | 6/1999 |
| JP | 2001113406 A | 4/2001 |
| WO | 0033994 A1 | 6/2000 |

* cited by examiner

CUTTING TOOL

CLAIM TO PRIORITY

This application is a National entry application of German Application No. 102013218884.6, filed on Sep. 19, 2013, the entire contents of which is incorporated herein by reference.

BACKGROUND OF THE INVENTION

Field of the Invention

The invention relates to a cutting tool, particularly for use in a tool chuck of a machine tool, comprising a tool shaft with a center longitudinal axis and a tool head.

Description of Related Art

Cutting or machining tools such as, for example, milling tools or lathe tools, are constructed from multiple parts in some cases and usually comprise a tool shaft and a tool head connected thereto. The tool head in this case is used for the actual machining of workpieces, i.e. to remove material, and accordingly has at least one cutting edge or one cutting insert. The tool shaft, on the other hand, is normally formed for use in a tool chuck of the machine tool and frequently functions additionally as a type of extension so that the tool head can be positioned in the desired location, for example in a recess or borehole.

As a result of this, a cutting tool typically has an elongated shape and is additionally clamped on one side when ready for operation. Therefore, it behaves similar to a cantilever or bent bellows clamped on one side, the free end of which is subject to bending and torsional forces, when workpieces are machined.

When selecting suitable material for a cutting tool, care must be taken to ensure that the material can withstand the maximum possible bending and torsional forces and is additionally as nonsensitive as possible to impacts. This applies, for example, to so-called high-speed steels that are accordingly used frequently. The hardness of such types of high-speed steels is insufficient for an entire series of applications however, which is why in such cases it is preferable to use so-called carbides. In comparison to high-speed steels, carbides have increased hardness and accordingly enable machining also of workpieces made of harder materials with cutting tools made of carbide. In addition, the wear that occurs caused by abrasion is less with the corresponding carbides. However, as the hardness increases, typically the brittleness of a material also increases, which means that suitable carbides are relatively sensitive to impacts or vibrations.

In addition, brittle materials also have the problem of stress effects, because they do not plastically deform when reaching the elasticity limit but instead immediately fracture so to speak. This is particularly significant with so-called cutting system tools made of carbide. With a corresponding system tool, a tool change head made of carbide, for example a replaceable milling head, is screwed into a tool shaft under pretension. A carbide-carbide connection is critical due to the stresses.

In order to then obtain a cutting tool that is as wear-resistant as possible and also as nonsensitive to impacts, vibrations, and bending forces as possible, different materials are combined with one another and a corresponding cutting tool is designed so to speak from multiple parts. Thus, WO 0033994 A1 describes, for example, a cutting tool for use in a tool chuck of a machine tool having a tool shaft and a tool head, in which different metals having differing hardness and thus differing brittleness as well are used for producing the tool head and tool shaft. When producing the cutting tool, the tool head and the tool shaft are connected to one another, for example, through soldering, in which the ends of the tool shaft and the tool head soldered together have complementary-formed V-shaped profiles.

This design is also used in a similar form for cutting system tools, in which a coupling element or a connecting element made of a tool steel is inserted between the tool change head made of solid carbide and the tool shaft also made of solid carbide. The tool shaft and the coupling element in this case are bonded together through soldering, in which the ends of the tool shaft and the coupling element soldered together have complementary-formed V-shaped profiles. The tool change head is then screwed into the coupling element and no longer in the tool shaft.

The problem with cutting tools designed in this manner, however, is the fact that the corresponding solder connections will fracture under higher loads.

SUMMARY OF THE INVENTION

Starting from this point, the object of the invention was to provide an advantageously designed cutting tool.

This object is achieved according to the invention by a cutting tool with the features of claim 1. Preferred further embodiments are contained in the claims referring to this.

A corresponding cutting tool in this case is formed for use in a tool chuck of a machine tool and comprises a tool shaft with a center longitudinal axis as well as a tool head. The tool head is used for the actual machining of workpieces, i.e. to remove material, and accordingly has at least one cutting edge or one cutting insert. The tool head and the tool shaft are connected via a positive-locking connection that locks the movement in the direction of the center longitudinal axis on one side and a bonded connection supplementing the positive-locking connection, particularly a soldered connection. In this manner, a particularly stable and torsionally stiff connection is implemented between the tool head and the tool shaft, which means that the cutting tool can also withstand relatively high bending and/or torsional forces. Thus, this also particularly prevents the connection between the tool head and the tool shaft from being fractured due to the acting forces.

The cutting tool in this case is designed either as a tool for a tool chuck not rotating during operation, i.e. as a lathe tool or, as preferred, as a tool for a tool chuck rotating during operation, i.e. as a milling tool or drill for example.

The positive-locking connection is more preferably formed as a type of mortise-and-tenon connection between a profiled tenon and a profiled mortise that is complementary to it, wherein more preferably the tool shaft has the profiled tenon. Furthermore, the profiling of the mortise and tenon is particularly designed such that an enlarged contact surface is formed between the tenon and mortise on one hand, at least in relation to a simple V-shaped profile, and the movement in the direction of the center longitudinal axis is blocked by positive engagement on the other hand. While the enlarged contact surface serves to enhance the bonded connection, that is enable soldering over a larger surface for example, increased resistance of the cutting tool to tensile, bending, and torsional forces is achieved through the special positive-locking connection.

In addition, an embodiment variant is preferred in which the tenon has a T-shaped profile with a top facing toward the mortise and a base facing away from the mortise. The top in this case functions as a type of rear grip element, which engages in the material protrusion extending in the transverse direction with respect to the center longitudinal axis in the mortise, whereby the locking effect is achieved in the direction of the center longitudinal axis of the positive-locking connection. Any T-shaped profile or T-shaped cross-section can be relatively easily produced, for example through milling, based on which the tenon has a type of hammer shape.

In an advantageous further embodiment, the base tapers in the direction of the mortise, when viewed cross-sectionally, or in other words, the base widens starting from the top as the distance increases. This causes the tenon to have contact surfaces positioned at a tilt with respect to the central longitudinal axis that are there to accommodate the bending forces. The angle between the center longitudinal axis and the surface normals determines in this case how large the portion of bending forces occurring is as a press-on force or pressure force between said tilted contact surface on the tenon and the adjoining contact surface of the mortise. The larger this portion is, the smaller the remaining directional portion that acts perpendicularly with respect to the surface normals and accordingly stresses particularly the bonded connection.

Alternatively, the tenon has a profile or a cross-section with basic rectangular geometry and teeth protruding transversely with respect to the center longitudinal axis. In this case, the protruding teeth serve as rear grip elements and thus to block the movement in the direction of the center longitudinal axis. The teeth in this case are preferably placed on two opposing sides of the tenon and additionally arranged in pairs in relation to the positioning in the direction of the central longitudinal axis. This means that there are always two teeth at the same height opposite one another in relation to the central longitudinal axis on two opposite sides of the tenon. In addition, the teeth advantageously have a shape that is rounded off and thus less susceptible to fracture and are furthermore positioned preferably tilted with respect to the central longitudinal axis so that they point slightly away from the mortise. A comparable effect is achieved with this tilted position as with the tilted contact surfaces of the base with the T-shaped profile.

According to a slight modification, the mortise in the profile has a pyramid-stump-like basic geometry instead of a basic rectangular geometry with teeth protruding transversely with respect to the central longitudinal axis, which means that the tenon in the profile or in the cross-section exhibits a sort of Christmas-tree geometry.

With the assistance of the combined positive-locking and bonded connection, two different materials or substances are appropriately connected with one another, wherein the tool shaft is preferably produced from a so-called carbide and wherein more preferably the corresponding carbide is connected to a tool steel, particularly a high-speed steel, via the positive-locking and bonded connection. The bonded connection in this case is advantageously produced from soldering, wherein, in this case, the tenon and the mortise are designed such that uniform clearance, when viewed over the entire profile, is provided as fill or collection space for solder. In addition, the tenon is preferably arranged at a carbide component of the tool, i.e. particularly the tool shaft, while the mortise is incorporated in a tool steel component of the tool or placed at it.

According to an embodiment variant, the tool head is then connected directly to the tool shaft via the positive-locking connection, which requires relatively less production effort.

Alternatively, a coupling element is placed between the tool head and the tool shaft, wherein the coupling element is connected directly to the tool shaft via the positive-locking connection. The tool head is thus attached directly to the tool shaft via the coupling element. The tool head in this case is attached to the coupling element in either a reversible detachable manner, i.e. via a screw or clamp connection for example, or connected to it via a non-detachable connection, particularly a bonded connection. The tool head in this case is preferably made of carbide. If a coupling element is used, it is preferable in this case for the tool shaft and the coupling element or the tool shaft, the coupling element, and the tool head to be produced from different materials. In addition, the coupling element is preferably designed to be a short as possible, and the intended overall length, i.e. the expansion in the direction of the center longitudinal axis, of the tool is specified by an adaptation of the length of the tool shaft.

In particular in the event of an embodiment with a reversible, detachable connection between the coupling element and the tool head, the tool head is designed as a replaceable milling head and particularly as a solid carbide replaceable milling head according to a preferred embodiment variant.

According to a further embodiment variant, the tool head has a base or support body, which, in comparison to the tool shaft and to the coupling element, is produced from a material with the lowest hardness, and which has at least one cutting insert attached thereto in a reversible detachable manner. As an alternative to this, the tool head is formed as a single part or a one-piece component.

The tool head or optionally at least the base or support body and/or the coupling element are preferably thus produced from a material that is less hard than the tool shaft and thus also less brittle, and accordingly they are less sensitive to impacts, bending forces, and vibrations. They typically have a higher elasticity and can thus absorb the forces, impacts, or vibrations that occur relatively well, which means that the tool head and/or the coupling element has a dampening effect, whereby the tool shaft, which is produced from a material that is comparatively brittle, is protected from overload.

Apart from the cutting edges or cutting inserts, wear then occurs initially at the tool head and/or at the cutting element, while the tool shaft exhibits hardly any appearance of wear. For this reason, corresponding cutting tools are preferably prepared according to use, wherein the bonded connection, i.e. the soldered connection for example, is dissolved. While the components affected by wear, i.e. the tool head and/or the coupling element, are disposed of, the tool shaft is inspected for wear or damage and, in the best case scenario, can be reused multiple times, i.e. soldered with a new tool head or coupling element.

According to the application purpose, a cutting tool provided in this case additionally has at least one coolant line, which is integrated into the cutting tool and through which a coolant and/or lubrication agent is routed during operation.

If a cylinder-shaped cutting tool is used, a tool diameter of between 8 mm in 32 mm is further preferred.

BRIEF DESCRIPTION OF THE DRAWINGS

Exemplary embodiments of the invention are explained in more detail in the following using a schematic drawing. Parts corresponding to one another have the same reference numbers in all figures. The following is shown.

DETAILED DESCRIPTION OF THE INVENTION

Figure 1:
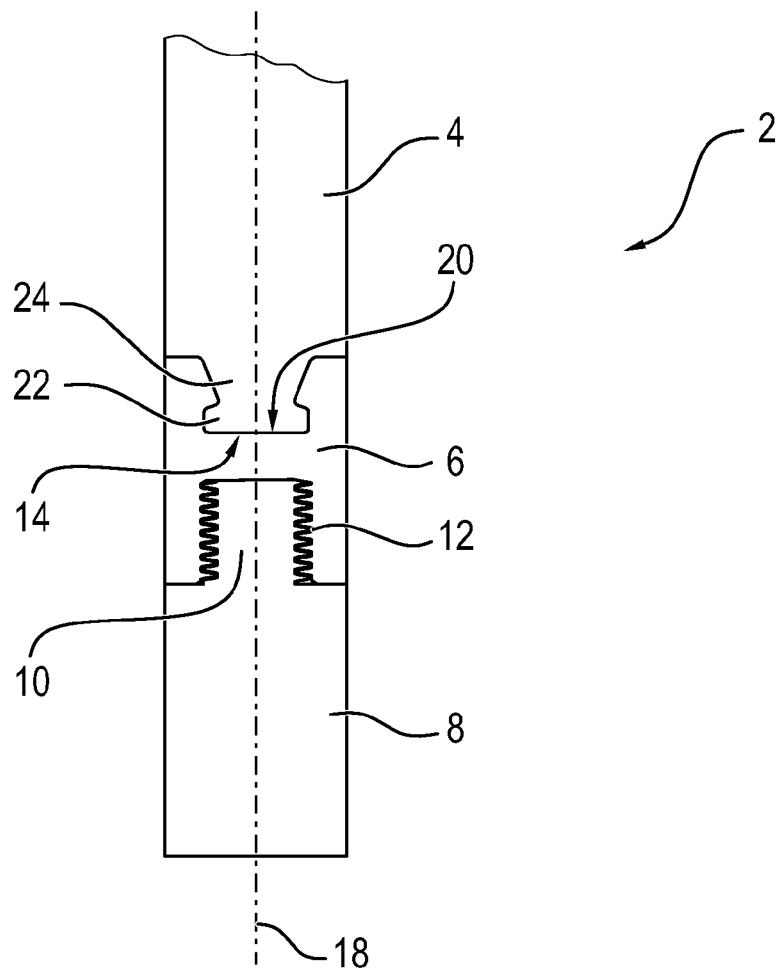
FIG. 1 shows a cross-sectional representation, when looking in an assembly direction, of a milling tool with a tool shaft, a coupling element, and a replaceable milling head.

A cutting tool, described by means of example in the following and shown in FIG. 1, is formed as a multi-piece milling tool 2 and has a tool shaft 4, a coupling element 6, as well as a replaceable milling head 8. In this case, the tool shaft 4 and the replaceable milling head 8 are each produced from carbide, while the coupling element 6 is produced from tool steel.

Figure 2:
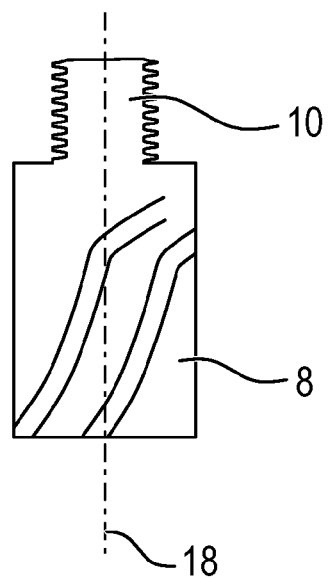
FIG. 2 shows a side view, when looking in the assembly direction, of the replaceable milling head.

The coupling element 6 and the replaceable milling head 8 are connected to each other via a threaded connection, which is reversible and detachable, so that essentially various replaceable milling heads 8 can be combined with the coupling element 6, or however the replaceable milling head 8 can simply be replaced if worn. In this case, the replaceable milling head 8, as depicted in FIG. 2, has a threaded pin 10, which is threaded into a recess 12 with a counter-thread to form a threaded connection.

Contrary to this, the tool shaft 4, which is formed for a tool chuck, which is not shown, of a machine tool, and the coupling element 6 are attached to one another via a non-detachable connection. This connection in this case represents a combination of a positive-locking connection and a bonded connection, in which the bonded connection is established through soldering and in which the positive-locking connection is formed as a type of mortise-and-tenon connection.

Figure 3:
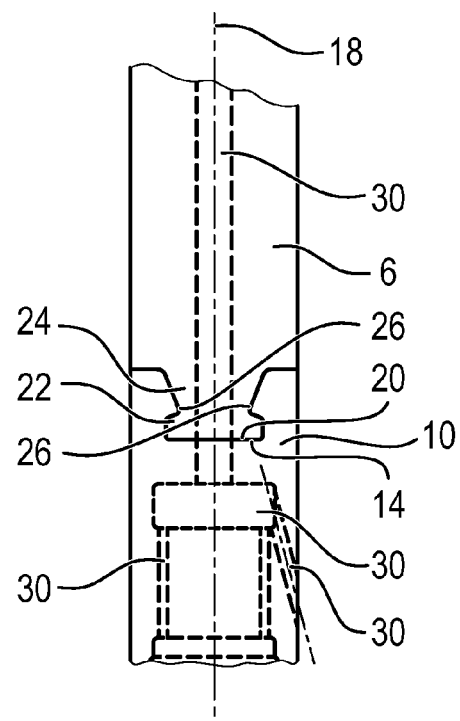
FIG. 3 shows the side view of a section of the milling tool in a connection area between the tool shaft and the coupling element.
Figure 4:
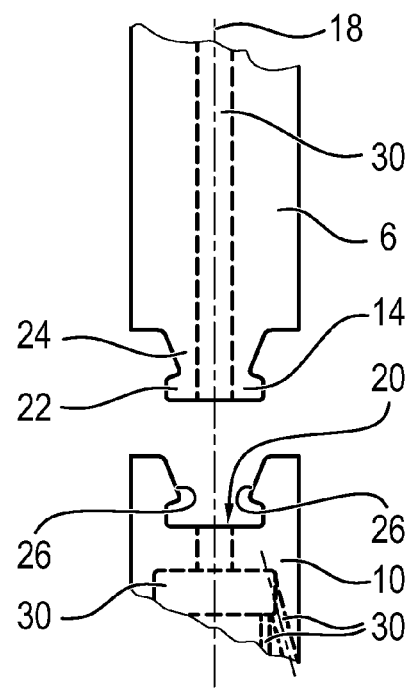
FIG. 4 shows the side view of a section of the milling tool with the connection disconnected between the tool shaft and the coupling element.
Figure 5:
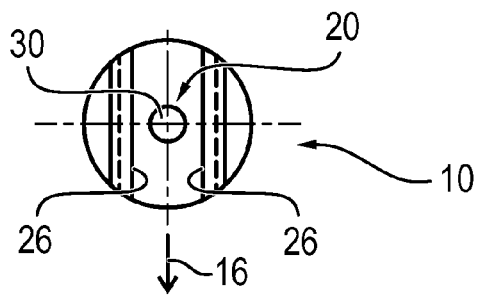
FIG. 5 shows a view when looking in the direction of a center longitudinal axis of the coupling element with the connection disconnected.

The corresponding mortise-and-tenon connection in this case is established by inserting a profiled tenon 14 along an assembly direction 16 transverse with respect to a center longitudinal axis 18 of the milling tool 2 into a complementary profiled mortise 20. The design of the tenon 14 and the mortise 20 in this case is of particular significance for the torsional stiffness and loading capacity of the combined connection comprising the positive-locking and bonded connection, and a variant is shown in FIG. 3 through FIG. 5. FIG. 3 and FIG. 4 in this case show the connection area between the tool shaft 4 and the coupling element 6, in which the tenon 14 and the mortise 20 are separated from one another in FIG. 4, while the mortise-and-tenon connection is shown in FIG. 3.

The shape of the tenon 14 has a T-shaped cross-section with a flat top 22 facing toward the mortise and a base 24 connected thereto, an expansion of which increases transversely with respect to the center longitudinal axis 18 and transversely with respect to the assembly direction 16 in the direction of the tool shaft 4, so that the base 24, which is arranged centrally around the center longitudinal axis 18 exhibits a pyramid-stump-like profile. This results in contact surfaces between the tenon 14 and the mortise 20, the surface normals of which are aligned parallel with respect to the center longitudinal axis 18, perpendicular with respect to the center longitudinal axis 18, and tilted toward the center longitudinal axis 18. The corresponding contact surfaces in this case serve to accommodate pressure, torsional, and bending forces. In addition, the top 22 acts as a rear grip element, which engages in the complementary material protrusions 26 in the mortise 20. This causes the movement to be blocked in the direction of the center longitudinal axis and, as a result of this, the top 22 and the material protrusions 26 serve, in particular, to accommodate tensile forces. The positive-locking connection is thus designed to accommodate occurring forces of varying types, so that they stress the bonded connection to a lesser degree.

Figure 6:
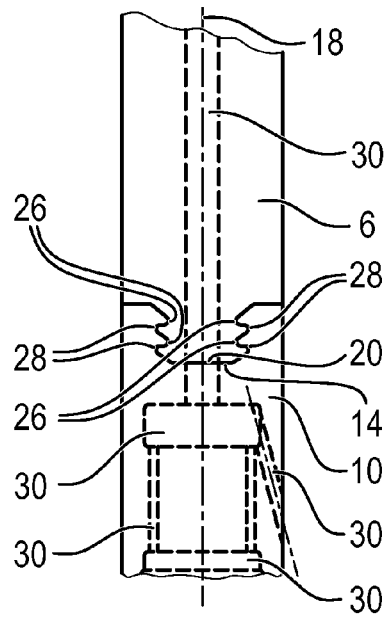
FIG. 6 shows the side view of a section of an alternative milling tool in a connection area between an alternative tool shaft and an alternative coupling element.
Figure 7:
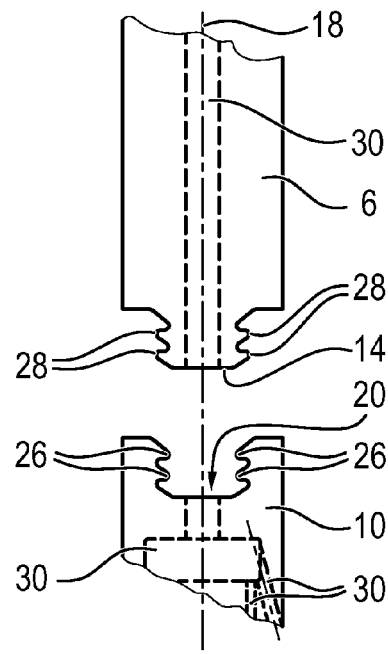
FIG. 7 shows the side view of a section of the alternative milling tool in the connection area between the alternative tool shaft and the alternative coupling element with the connection disconnected.
Figure 8:
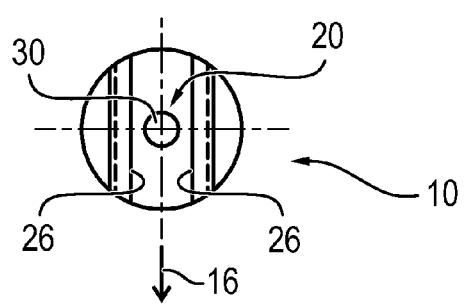
FIG. 8 shows a view when looking in the direction of a center longitudinal axis of the alternative coupling element with the connection disconnected.

FIG. 6, FIG. 7, and FIG. 8 show an alternative embodiment of the tenon 14 and mortise 20, in which the tenon 14 and mortise 20 only differ from the previously described exemplary embodiment with respect to the design of the cross-section. The cross-section shown here has a rectangular basic geometry with teeth 28 protruding transversely with respect to the center longitudinal axis 18 and is similar to the typical shape of a pyramid. The teeth 28 in this case are arranged in pairs on two opposing sides of the tenon 14, so that there are always two teeth 28 positioned at the same height in relation to the center longitudinal axis 18. One or more teeth 28, for example 2 to 4 teeth 28, are formed in the direction of the center longitudinal axis 18. The teeth 28 further have a rounded-off shape and, in addition, the teeth are slightly tilted in the direction of the central longitudinal axis 18, so that they in turn have contact surfaces, the surface normals of which are tilted toward the center longitudinal axis 18, similar as for the base 24 of the previously described example.

FIG. 3 to FIG. 8 also show coolant lines 30 integrated into the milling tool, through which coolant and/or lubricant is routed during operation of the milling tool 2.

The invention is not limited to the previously described exemplary embodiment. Rather, there may be other variants of the invention one skilled in the art may derive without going beyond the subject matter of the invention. In particular, all of the individual features described in connection with the exemplary embodiment may additionally be combined with one another in another fashion without going beyond the subject matter of the invention.

What is claimed is:

1. A cutting tool comprising:
   a tool shaft with a center longitudinal axis;
   a tool head;
   a profiled tenon disposed on the tool shaft; and
   a profiled mortise that is complementary to the profiled tenon,
   wherein the tool head is connected to the tool shaft via a positive locking connection that locks the movement in the direction of the center longitudinal axis and that the positive-locking connection is supplemented by a bonded connection;
   wherein the positive-locking connection is formed as a mortise-and-tenon connection between the profiled tenon and the profiled mortise.

2. The cutting tool according to claim 1, wherein the tenon has a T-shaped profile with a top facing toward the mortise and a base facing away from the mortise.

3. The cutting tool according to claim 2, wherein the base tapers in the direction of the top, when viewed cross-sectionally.

4. The cutting tool according to claim 1, wherein the tenon has a profile with basic rectangular geometry and teeth protruding transversely with respect to the center longitudinal axis.

5. The cutting tool according to claim 1, wherein the tenon has a profile with Christmas-tree-shaped geometry.

6. The cutting tool according to claim 1, wherein a carbide and a tool steel or a high-speed steel are connected to one another via the positive-locking connection.

7. The cutting tool according to claim 1, wherein:
the profiled mortise is disposed on the tool head; and
the tool head is connected directly to the tool shaft via the positive-locking connection.

8. The cutting tool according to claim 1, wherein:
a coupling element is placed between the tool head and the tool shaft;
the profiled mortise is disposed on the coupling element;
the coupling element is connected to the tool shaft via the positive-locking connection; and
the coupling element is connected to the tool head.

9. The cutting tool according to claim 8, wherein the tool head is attached to the coupling element in a reversible detachable manner.

10. The cutting tool according to claim 9, wherein the tool head is formed as a replaceable milling head.

11. The cutting tool according to claim 1, wherein the tool head comprises a support body and at least one cutting insert attached thereto in a reversible detachable manner.

* * * * *